US012147188B2

(12) United States Patent
Sato et al.

(10) Patent No.: US 12,147,188 B2
(45) Date of Patent: Nov. 19, 2024

(54) IMAGE FORMING APPARATUS INCLUDING PROCESS CARTRIDGE PROVIDED WITH TONER RECEIVING PART FOR RECEIVING TONER

(71) Applicant: BROTHER KOGYO KABUSHIKI KAISHA, Nagoya (JP)

(72) Inventors: Shougo Sato, Seto (JP); Daisuke Maeta, Nagoya (JP); Kazuna Taguchi, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 18/329,822

(22) Filed: Jun. 6, 2023

(65) Prior Publication Data

US 2023/0315005 A1 Oct. 5, 2023

Related U.S. Application Data

(63) Continuation of application No. 17/810,407, filed on Jul. 1, 2022, now Pat. No. 11,714,380.

(30) Foreign Application Priority Data

Jul. 6, 2021 (JP) ................................ 2021-112434

(51) Int. Cl.
*G03G 21/16* (2006.01)
*G03G 21/10* (2006.01)
*G03G 21/18* (2006.01)

(52) U.S. Cl.
CPC ....... *G03G 21/1814* (2013.01); *G03G 21/105* (2013.01); *G03G 21/1825* (2013.01)

(58) Field of Classification Search
CPC ........... G03G 15/0881; G03G 15/0898; G03G 21/10; G03G 21/105; G03G 21/1676; G03G 21/1814; G03G 21/1817; G03G 21/1825
See application file for complete search history.

(56) References Cited

U.S. PATENT DOCUMENTS 11,300,920 B2 4/2022 Yamada et al.
11,561,499 B2 1/2023 Yamada et al.
(Continued)

FOREIGN PATENT DOCUMENTS

JP 2017182011 A 10/2017

OTHER PUBLICATIONS

Notice of Allowance dated Mar. 13, 2023 from parent application U.S. Appl. No. 17/810,407.

*Primary Examiner* — Hoang X Ngo
(74) *Attorney, Agent, or Firm* — Scully, Scott, Murphy & Presser, PC

(57) ABSTRACT

An image forming apparatus includes: a main body casing having an opening; a cover movable between a closing position to close the opening and an opening position to open the opening; and a process cartridge detachably attachable to the main body casing through the opening while the cover is at the opening position. The process cartridge includes: a photosensitive drum; a developing device; a toner receiving part; and a toner conveying part. The toner receiving part has a first end portion and a second end portion. The first end portion has a receiving opening for receiving toner. When the cover is at the closing position and the process cartridge is in the attached state, the first end portion is outside the main body casing while the second end
(Continued)

portion is inside the main body casing. The toner conveying part conveys toner in the toner receiving part to the developing device.

10 Claims, 8 Drawing Sheets

(56) References Cited

U.S. PATENT DOCUMENTS

2017/0108800 A1* 4/2017 Sato .................. G03G 15/0886
2017/0285568 A1 10/2017 Nishiyama et al.

* cited by examiner

IMAGE FORMING APPARATUS INCLUDING PROCESS CARTRIDGE PROVIDED WITH TONER RECEIVING PART FOR RECEIVING TONER

REFERENCE TO RELATED APPLICATIONS

This application is a continuation of U.S. patent application Ser. No. 17/810,407, filed Jul. 1, 2022, which claims priority from Japanese Patent Application No. 2021-112434 filed Jul. 6, 2021. The entire contents of the aforementioned applications are incorporated herein by reference.

BACKGROUND ART

There has conventionally been known an image forming apparatus including a main body casing, a cover, a process cartridge, and a fixing device. The main body casing has an opening. The cover is configured to open and close the opening. The process cartridge has a photosensitive drum, and a developing device. The process cartridge is positioned between the fixing device and the cover in a state where the process cartridge is attached to the main body casing. The process cartridge can be replaced with a new one through the opening in a state where the cover is opened.

DESCRIPTION

For the above conventional image forming apparatus, there is required a reduction in replacement frequency of the process cartridge.

In view of the foregoing, it is an object of the present disclosure to provide: an image forming apparatus capable of reducing replacement frequency of a process cartridge; and a process cartridge capable of reducing replacement frequency thereof.

In order to attain the above and other objects, according to one aspect, the present disclosure provides an image forming apparatus including: a main body casing, a cover, a fixing device, and a process cartridge. The main body casing has an opening. The cover is movable between a closing position where the cover closes the opening and an opening position where the cover opens the opening. The fixing device is positioned away from the cover. The process cartridge is attachable to and detachable from the main body casing through the opening in a state where the cover is at the opening position. The process cartridge is positioned between the fixing device and the cover in a state where the process cartridge is attached to the main body casing. The process cartridge includes: a photosensitive drum, a developing device, a toner receiving part, and a toner conveying part. The developing device includes a developing roller and is configured to supply toner to the photosensitive drum. The toner receiving part has a first end portion and a second end portion. The first end portion has a receiving opening for receiving toner. The first end portion is positioned outside the main body casing in a state where the process cartridge is attached to the main body casing and the cover is at the closing position. The second end portion is positioned inside the main body casing in the state where the process cartridge is attached to the main body casing and the cover is at the closing position. The toner conveying part is configured to convey toner in the toner receiving part to the developing device.

With the above configuration, when the amount of toner remaining in the developing device becomes small, the toner receiving part can be replenished with toner from the outside of the image forming apparatus in a state where the process cartridge is attached to the image forming apparatus. Further, the toner supplied to the toner receiving part is conveyed by the toner conveying part to the developing device in the image forming apparatus. Hence, when the remaining amount of toner in the developing device becomes small, the developing device can be replenished with toner without replacement of the process cartridge. As a result, replacement frequency of the process cartridge can be reduced.

According to another aspect, the present disclosure provides a process cartridge for use with an image forming apparatus. The image forming apparatus includes: a main body casing, a cover, and a fixing device. The main body casing has an opening. The cover is movable between a closing position where the cover closes the opening and an opening position where the cover opens the opening. The fixing device is positioned away from the cover. The process cartridge is attachable to and detachable from the main body casing through the opening in a state where the cover is at the opening position. The process cartridge is positioned between the fixing device and the cover in a state where the process cartridge is attached to the main body casing. The process cartridge includes: a photosensitive drum, a developing device, a toner receiving part, and a toner conveying part. The developing device includes a developing roller. The developing device is configured to supply toner to the photosensitive drum. The toner receiving part has a first end portion and a second end portion. The first end portion has a receiving opening for receiving toner. The first end portion is positioned outside the main body casing in a state where the process cartridge is attached to the main body casing and the cover is at the closing position. The second end portion is positioned inside the main body casing in the state where the process cartridge is attached to the main body casing and the cover is at the closing position. The toner conveying part is configured to convey toner in the toner receiving part to the developing device.

1. OVERVIEW OF IMAGE FORMING APPARATUS 1

An overview will be given of an image forming apparatus 1 with reference to FIGS. 1 to 3.

Figure 1:
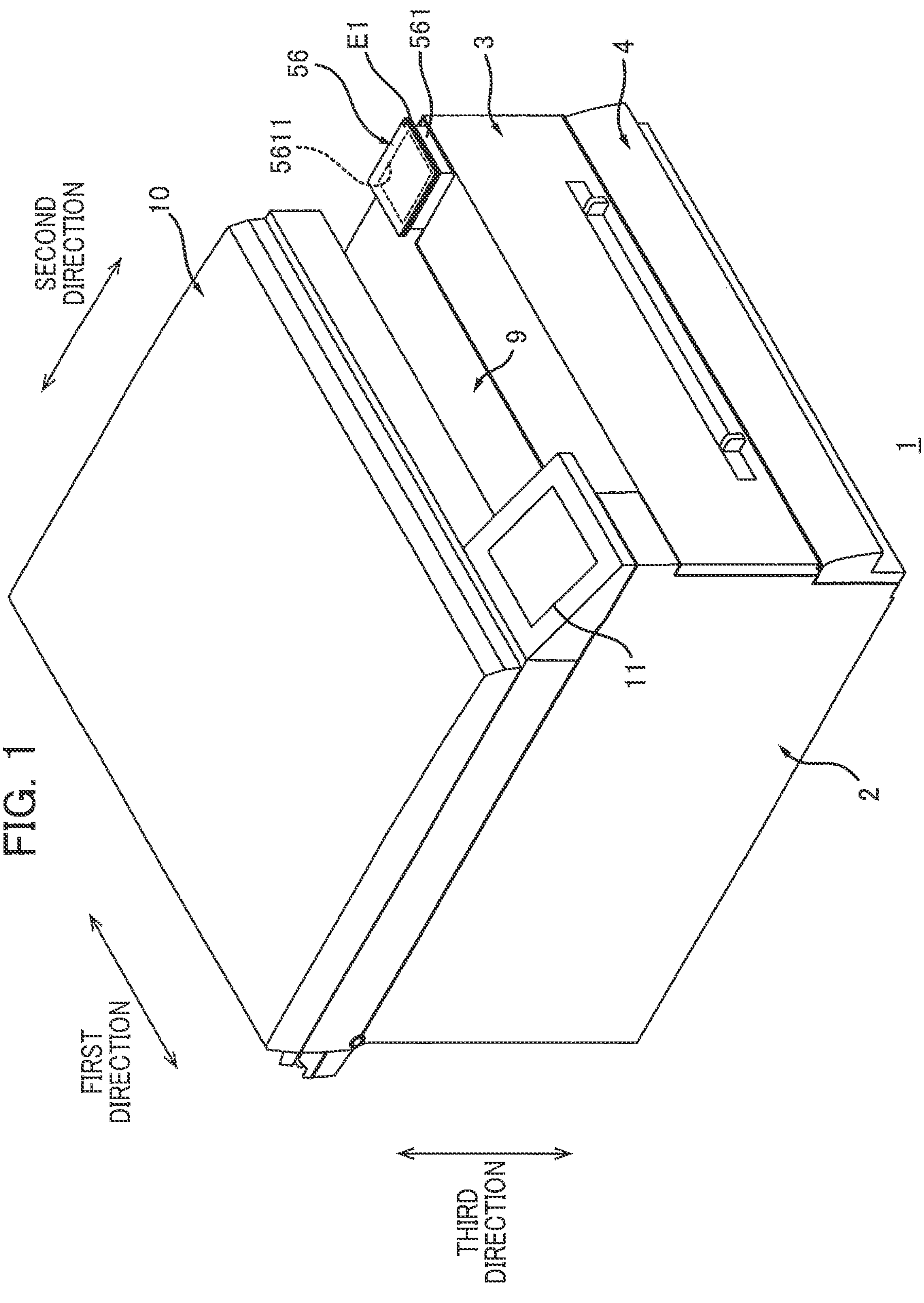
FIG. 1 is a perspective view of an image forming apparatus.
Figure 2:
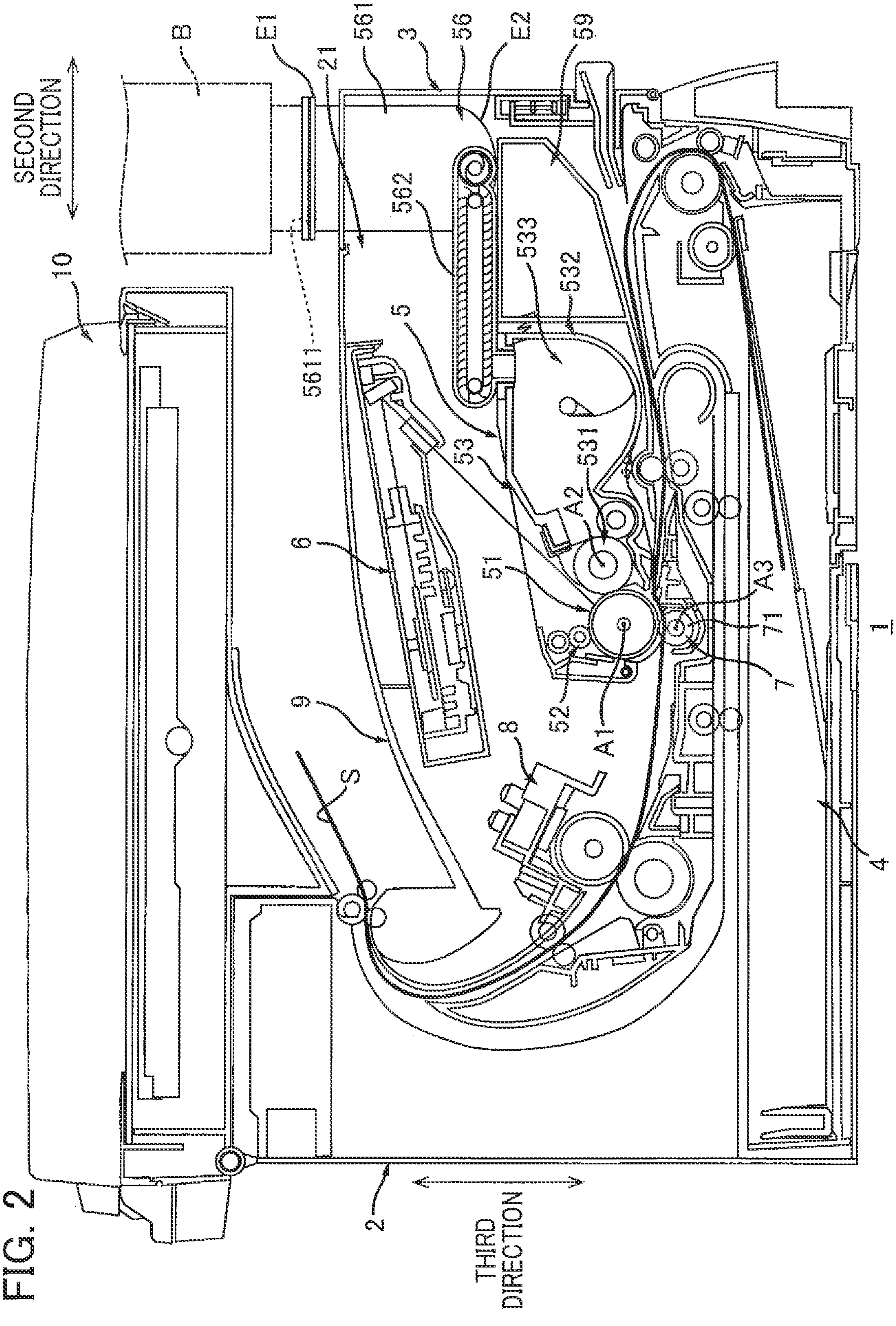
FIG. 2 is a cross-sectional view of the image forming apparatus of FIG. 1.

As illustrated in FIGS. 1 and 2, the image forming apparatus 1 has a main body casing 2, a cover 3, a sheet storage part 4, a process cartridge 5, an exposure device 6, a transfer device 7, a fixing device 8, a discharge tray 9, a reading device 10, and an operation panel 11.

<1.1 Main Body Casing 2>

The main body casing 2 houses therein the sheet storage part 4, process cartridge 5, exposure device 6, transfer device 7, and fixing device 8. The main body casing 2 has an opening 21 (see FIG. 3). The opening 21 is positioned at one end portion of the main body casing 2 in a second direction. The second direction will be described later.

<1.2 Cover 3>

Figure 3:
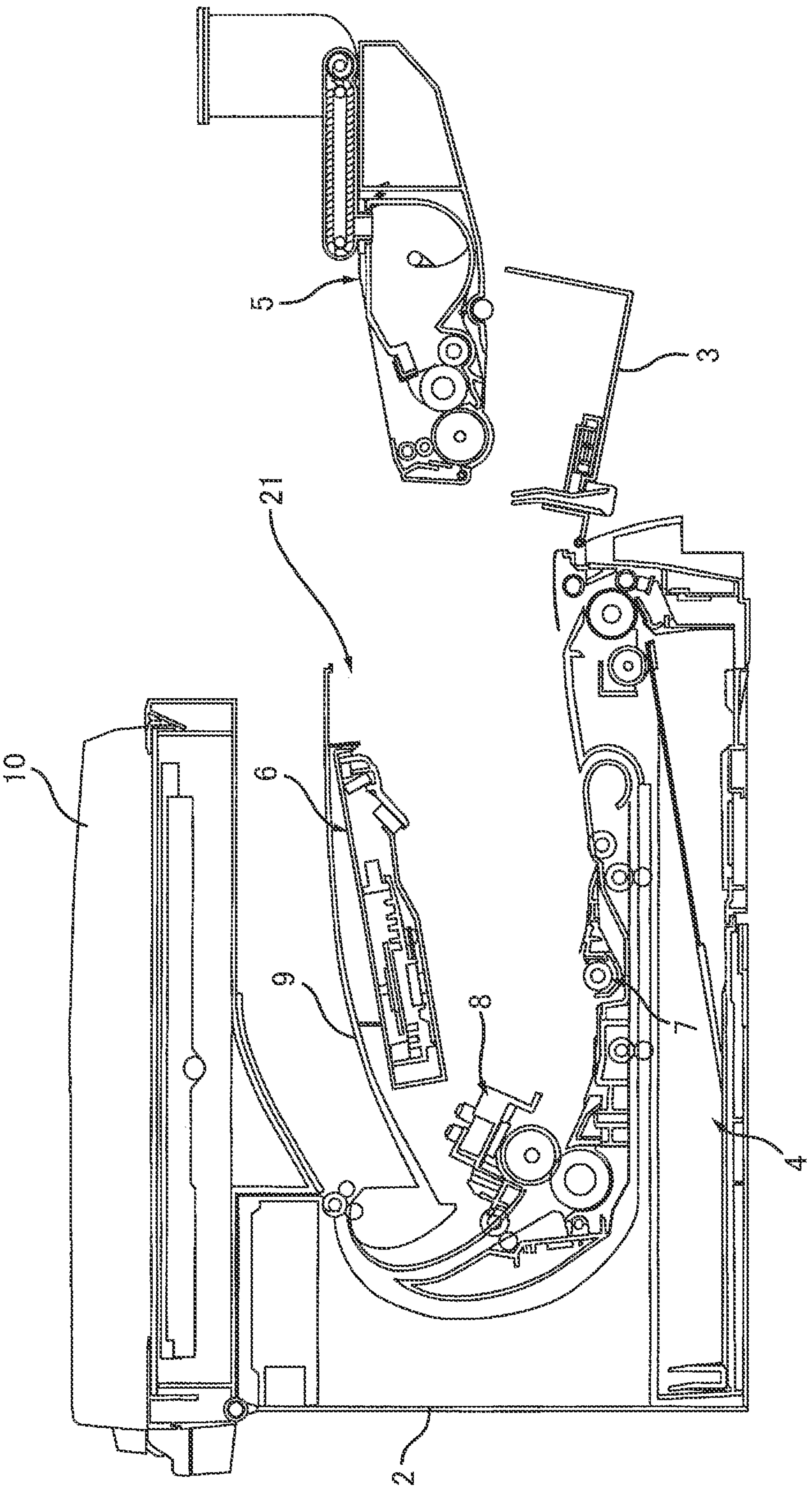
FIG. 3 is a view for explaining replacement of a process cartridge of FIG. 2.

The cover 3 is movable between a closing position (see FIG. 2) and an opening position (see FIG. 3). In a state where the cover 3 is at the closing position, the cover 3 closes the opening 21 as illustrated in FIG. 2. In a state where the cover 3 is at the opening position, the cover 3 opens the opening 21 as illustrated in FIG. 3.

<1.3 Sheet Storage Part 4>

As illustrated in FIG. 2, the sheet storage part 4 can store therein a sheet S. That is, the sheet storage part is for storing therein a sheet S. The sheet S in the sheet storage part 4 is conveyed toward a transfer roller 71. The transfer roller 71 will be described later.

<1.4 Process Cartridge 5>

The process cartridge 5 is attachable to and detachable from the image forming apparatus 1. Specifically, the process cartridge 5 is attachable to and detachable from the main body casing 2. In a state where the process cartridge 5 is attached to the main body casing 2, the process cartridge 5 is positioned between the fixing device 8 and the cover 3 in the second direction. In a state where the process cartridge 5 is attached to the main body casing 2, the process cartridge 5 is positioned between the sheet storage part 4 and the exposure device 6 in a third direction. The third direction will be described later. In a state where the cover 3 is at the opening position (see FIG. 3), the process cartridge 5 is attachable to and detachable from the main body casing 2 through the opening 21. Accordingly, in a state where the cover 3 is at the opening position (see FIG. 3), the process cartridge 5 can be replaced with a new one through the opening 21.

The process cartridge 5 includes a photosensitive drum 51, a charger 52, and a developing device 53.

<1.4.1 Photosensitive Drum 51>

The photosensitive drum 51 is rotatable about an axis A1. In a state where the process cartridge 5 is attached to the main body casing 2, the axis A1 extends in a first direction. The photosensitive drum 51 extends in the first direction. The photosensitive drum 51 has a cylindrical shape.

In a state where the process cartridge 5 is attached to the main body casing 2, the photosensitive drum 51 is positioned between the fixing device 8 and the cover 3 in the second direction. The second direction crosses the first direction. Preferably, the second direction is orthogonal to the first direction. In a state where the image forming apparatus 1 is placed on a horizontal plane, the second direction is orthogonal to both the first direction and the vertical direction.

In a state where the process cartridge 5 is attached to the main body casing 2, the photosensitive drum 51 is positioned on one side of the exposure device 6 in the third direction. The third direction crosses the first and second directions. Preferably, the third direction is orthogonal to both the first and second directions. In a state where the process cartridge 5 is attached to the main body casing 2, the photosensitive drum 51 is positioned between the sheet storage part 4 and the exposure device 6 in the third direction. In a state where the image forming apparatus 1 is placed on a horizontal plane, the third direction is the vertical direction. In a state where the image forming apparatus 1 is placed on a horizontal plane and the process cartridge 5 is attached to the main body casing 2, the photosensitive drum 51 is positioned below the exposure device 6.

<1.4.2 Charger 52>

The charger 52 is configured to charge the photosensitive drum 51. In the present embodiment, the charger 52 is a charging roller. The charger 52 may be a scorotron charger.

<1.4.3 Developing Device 53>

The developing device 53 is configured to supply toner to the photosensitive drum 51. In a state where the process cartridge 5 is attached to the main body casing 2, the developing device 53 is positioned between the photosensitive drum 51 and the cover 3 in the second direction. In a state where the process cartridge 5 is attached to the main body casing 2, the developing device 53 is positioned between the exposure device 6 and the sheet storage part 4 in the third direction. The developing device 53 includes a developing roller 531 and a developer casing 532.

The developing roller 531 is configured to supply the photosensitive drum 51 with toner stored in the developer casing 532. The developing roller 531 is in contact with the photosensitive drum 51. The developing roller 531 may be configured to come into contact with and separate from the photosensitive drum 51. In a state where the process cartridge 5 is attached to the main body casing 2, the developing roller 531 extends in the first direction. The developing roller 531 is rotatable about a developing axis A2. In a state where the process cartridge 5 is attached to the main body casing 2, the developing axis A2 extends in the first direction.

The developer casing 532 supports the developing roller 531. The developer casing 532 can store therein toner from a toner receiving part 561. The toner receiving part 561 will be described later. Specifically, the developer casing 532 has a toner storage part 533. In other words, the developing device 53 has the toner storage part 533. The toner storage part 533 can store therein toner.

<1.5 Exposure Device 6>

In a state where the process cartridge 5 is attached to the main body casing 2, the exposure device 6 is configured to expose the surface of the photosensitive drum 51 charged by the charger 52. The developing device 53 supplies toner to the exposed surface of the photosensitive drum 51. In the present embodiment, the exposure device 6 is a laser scan unit. The exposure device 6 may be an LED head.

<1.6 Transfer Device 7>

The transfer device 7 is configured to transfer toner on the photosensitive drum 51 onto the sheet S. Specifically, the sheet S fed from the sheet storage part 4 passes between the transfer device 7 and the photosensitive drum 51. At this time, the transfer device 7 transfers toner on the photosensitive drum 51 onto the sheet S. In the present embodiment, the transfer device 7 includes the transfer roller 71.

In a state where the process cartridge 5 is attached to the main body casing 2, the transfer roller 71 is positioned on one side of the photosensitive drum 51 in the third direction. In a state where the process cartridge 5 is attached to the main body casing 2, the transfer roller 71 is positioned between the photosensitive drum 51 and the sheet storage part 4 in the third direction. In a state where the process cartridge 5 is attached to the main body casing 2, the transfer roller 71 is in contact with the photosensitive drum 51. The transfer roller 71 extends in the first direction. The transfer roller 71 is rotatable about a transfer axis A3. In a state where the process cartridge 5 is attached to the main body casing 2, the transfer axis A3 extends in the first direction.

<1.7 Fixing Device 8>

The fixing device 8 is positioned away from the cover 3 in the second direction. The fixing device 8 is configured to fix toner onto the sheet S. In the present embodiment, the fixing device 8 heats and pressurizes the sheet S having toner transferred thereonto to thereby fix the toner onto the sheet S. The sheet S that has passed through the fixing device 8 is discharged to the discharge tray 9.

<1.8 Discharge Tray 9>

The discharge tray 9 can store thereon the sheet S that has passed through the fixing device 8 and then been discharged outside the main body casing 2. That is, the discharge tray 9 is a tray for storing thereon the sheet S that has passed through the fixing device 8 and then been discharged outside the main body casing 2. The discharge tray 9 is positioned on the upper surface of the main body casing 2. In other words, the discharge tray 9 is positioned on the surface of the main body casing 2 on the other side of the exposure device 6 in the third direction. The discharge tray 9 is positioned between the reading device 10 and the photosensitive drum 51 in the third direction.

<1.9 Reading Device 10>

The reading device 10 is configured to read an image of an original. The reading device 10 is positioned above the main body casing 2. In other words, the reading device 10 is positioned on the other side of the exposure device 6 in the third direction. The reading device 10 is positioned away from the discharge tray 9 in the third direction.

<1.10 Operation Panel 11>

The operation panel 11 is used for a user to input a command to the image forming apparatus 1. The operation panel 11 may be a touch panel. The operation panel 11 may include operation buttons. The operation panel 11 is positioned on one end portion of the reading device 10 in the second direction. The operation panel 11 is positioned on one end portion of the reading device 10 in the first direction.

2. DETAILS OF PROCESS CARTRIDGE 5

In the image forming apparatus 1 according to the present disclosure, in a state where the process cartridge 5 is attached to the main body casing 2, the developing device 53 can be replenished with toner. To replenish the developing device 53 with toner, as illustrated in FIG. 2, a user connects a toner bottle B having toner stored therein to the toner receiving part 561 in a state where the process cartridge 5 is attached to the main body casing 2. The user puts the toner in the toner bottle B into the inside of the toner receiving part 561. The toner in the toner receiving part 561 is fed to the developing device 53 by a toner conveying part 562. Thus, the developing device 53 is replenished with toner. After completion of the toner replenishment, the tonner bottle B is removed from the image forming apparatus 1. The toner receiving part 561 and toner conveying part 562 will be described later.

As illustrated in FIG. 3, the process cartridge 5 is replaced with a new one at a timing when, for example, the photosensitive drum 51 or developing roller 531 is considered to be deteriorated.

Hereinafter, with reference to FIGS. 4 to 8, details of the process cartridge 5 will be described. In the description of the process cartridge 5, the “first direction”, “second direction”, and “third direction” are directions in a state where the process cartridge 5 is attached to the main body casing 2.

Figure 4:
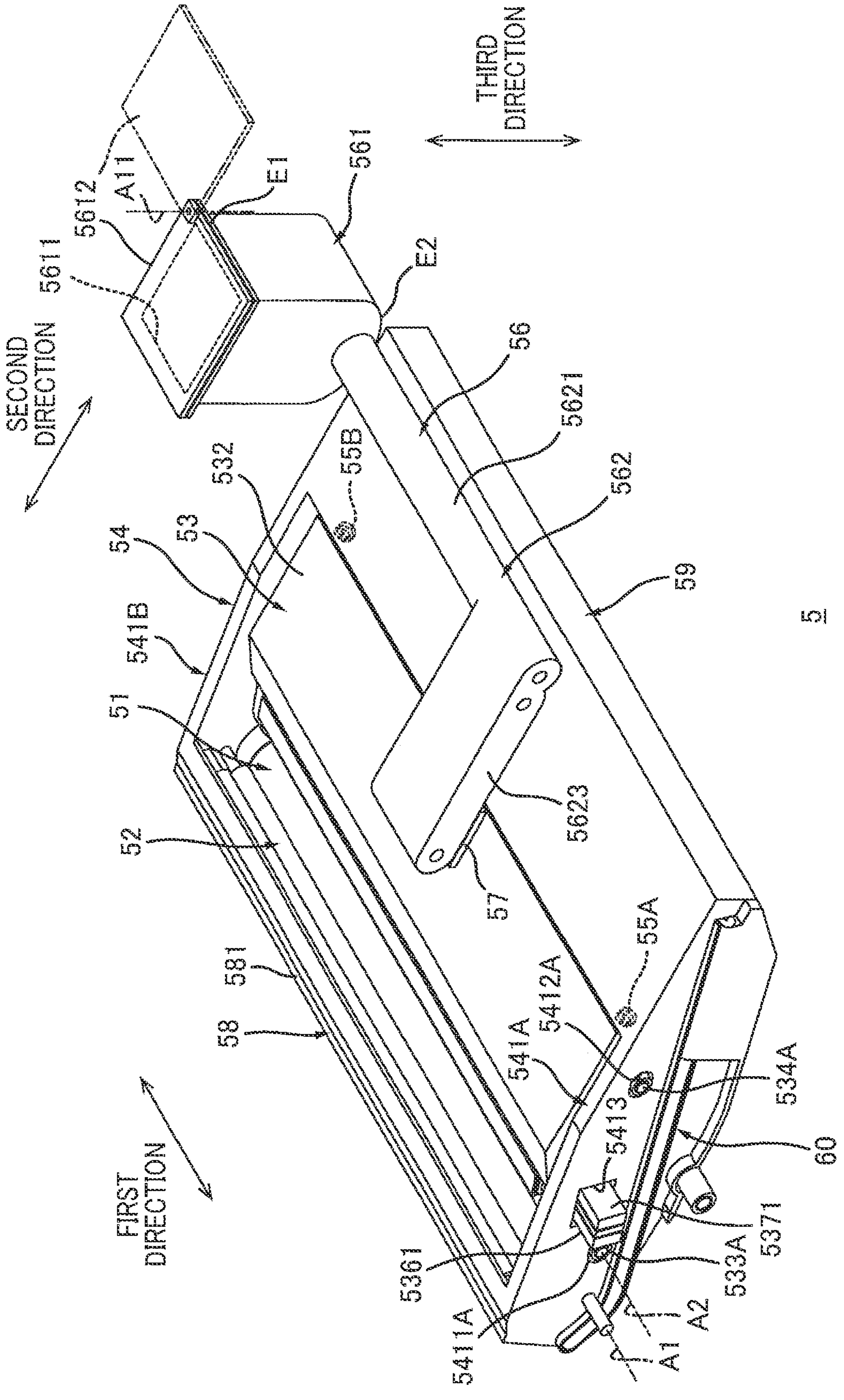
FIG. 4 is a perspective view of the process cartridge of FIG. 2.
Figure 5:
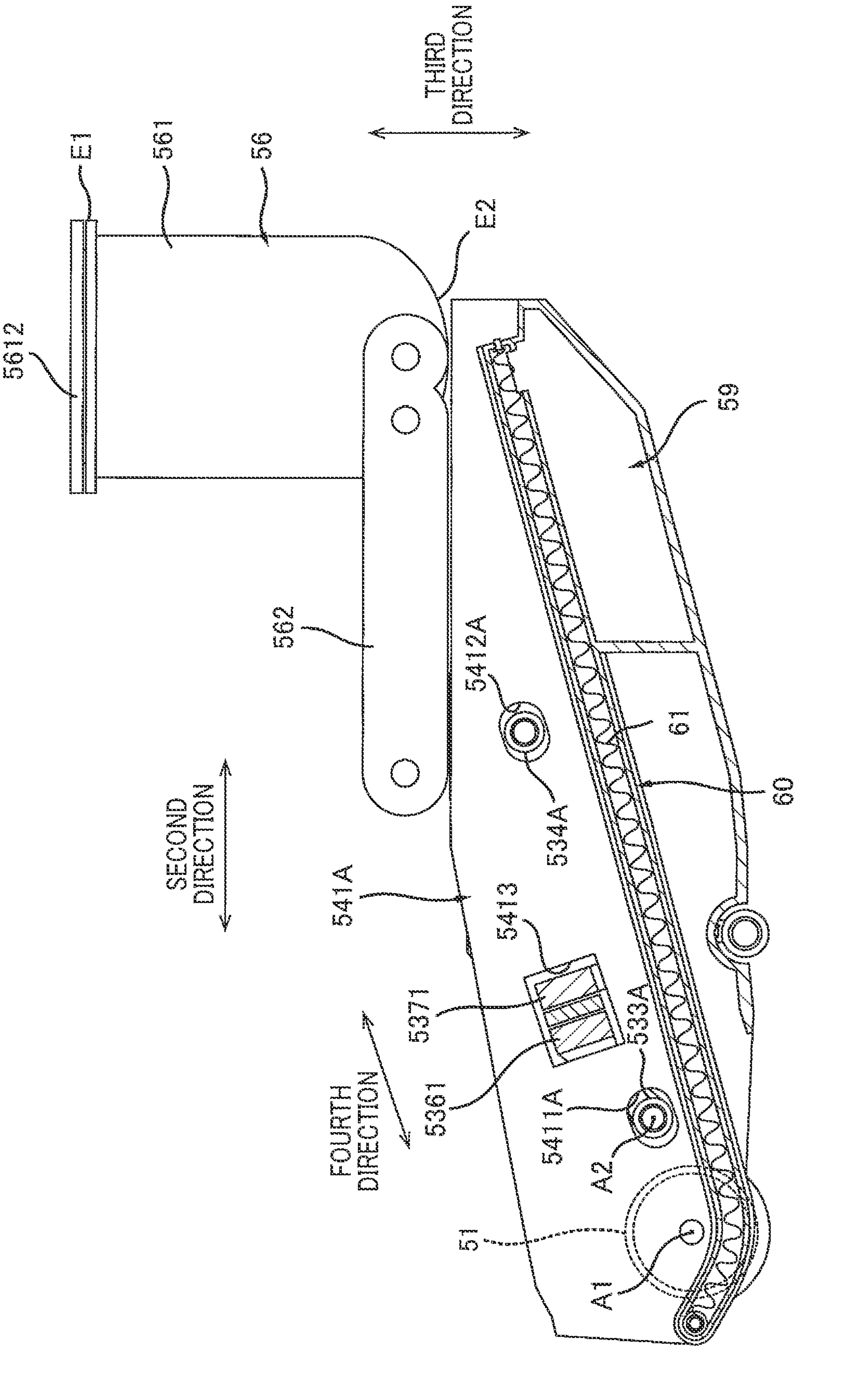
FIG. 5 is a cross-sectional view of the process cartridge of FIG. 4 taken along line V-V of FIG. 6.

As illustrated in FIG. 4, in addition to the above-described photosensitive drum 51, charger 52, and developing device 53, the process cartridge 5 includes a process frame 54, a plurality of pressing members 55A and 55B, a replenishing device 56, a sealing member 57, a drum cleaner 58, a waste toner storage part 59, a waste toner pipe 60, and a screw 61 (see FIG. 5).

<2.1 Process Frame 54>

The process frame 54 supports the photosensitive drum 51, charger 52, developing device 53, replenishing device 56, drum cleaner 58, waste toner storage part 59, and waste toner pipe 60. The process frame 54 includes a first side plate 541A and a second side plate 541B. In other words, the process cartridge 5 includes the first side plate 541A and the second side plate 541B.

The first side plate 541A is positioned at one end portion of the process frame 54 in the first direction. The first side plate 541A extends in the second and third directions. The first side plate 541A supports one end portion of the photosensitive drum 51 in the first direction, one end portion of the charger 52 in the first direction, and one end portion of the developing device 53 in the first direction. The first side plate 541A has two through holes 5411A and 5412A and an opening 5413.

As illustrated in FIG. 5, the through hole 5411A extends in a fourth direction. The fourth direction is a direction connecting the axis A1 and the developing axis A2. The through hole 5411A is an elongated hole. A projection 533A of the developing device 53 is fitted in the through hole 5411A. The projection 533A will be described later.

The through hole 5412A is positioned away from the through hole 5411A in the fourth direction. The through hole 5412A extends in the fourth direction. The through hole 5412A is an elongated hole. A projection 534A of the developing device 53 is fitted in the through hole 5412A. The projection 534A will be described later.

The opening 5413 is positioned between the through holes 5411A and 5412A in the fourth direction. The opening 5413 extends in the fourth direction. The opening 5413 has a rectangular shape. A projection 5361 of a developing electrode 536 and a projection 5371 of a supply electrode 537 penetrate the opening 5413. The developing electrode 536 and supply electrode 537 will be described later.

As illustrated in FIG. 4, the second side plate 541B is positioned at the other end portion of the process frame 54 in the first direction. The second side plate 541B is positioned away from the first side plate 541A in the first direction. The second side plate 541B extends in the second and third directions. The second side plate 541B supports the other end portion of the photosensitive drum 51 in the first direction, the other end portion of the charger 52 in the first direction, and the other end portion of the developing device 53 in the first direction. The second side plate 541B has two through holes 5411B and 5412B.

Like the through hole 5411A, the through hole 5411B extends in the fourth direction. The through hole 5411B is an elongated hole. A projection 533B (see FIG. 6) of the developing device 53 is fitted in the through hole 5411B. The projection 533B will be described later.

Like the through hole 5412A, the through hole 5412B is positioned away from the through hole 5411B in the fourth direction. The through hole 5412B extends in the fourth direction. The through hole 5412B is an elongated hole. A projection 534B (see FIG. 6) of the developing device 53 is fitted in the through hole 5412B. The projection 534B will be described later.

<2.2 Details of Developing Device 53>

Figure 6:
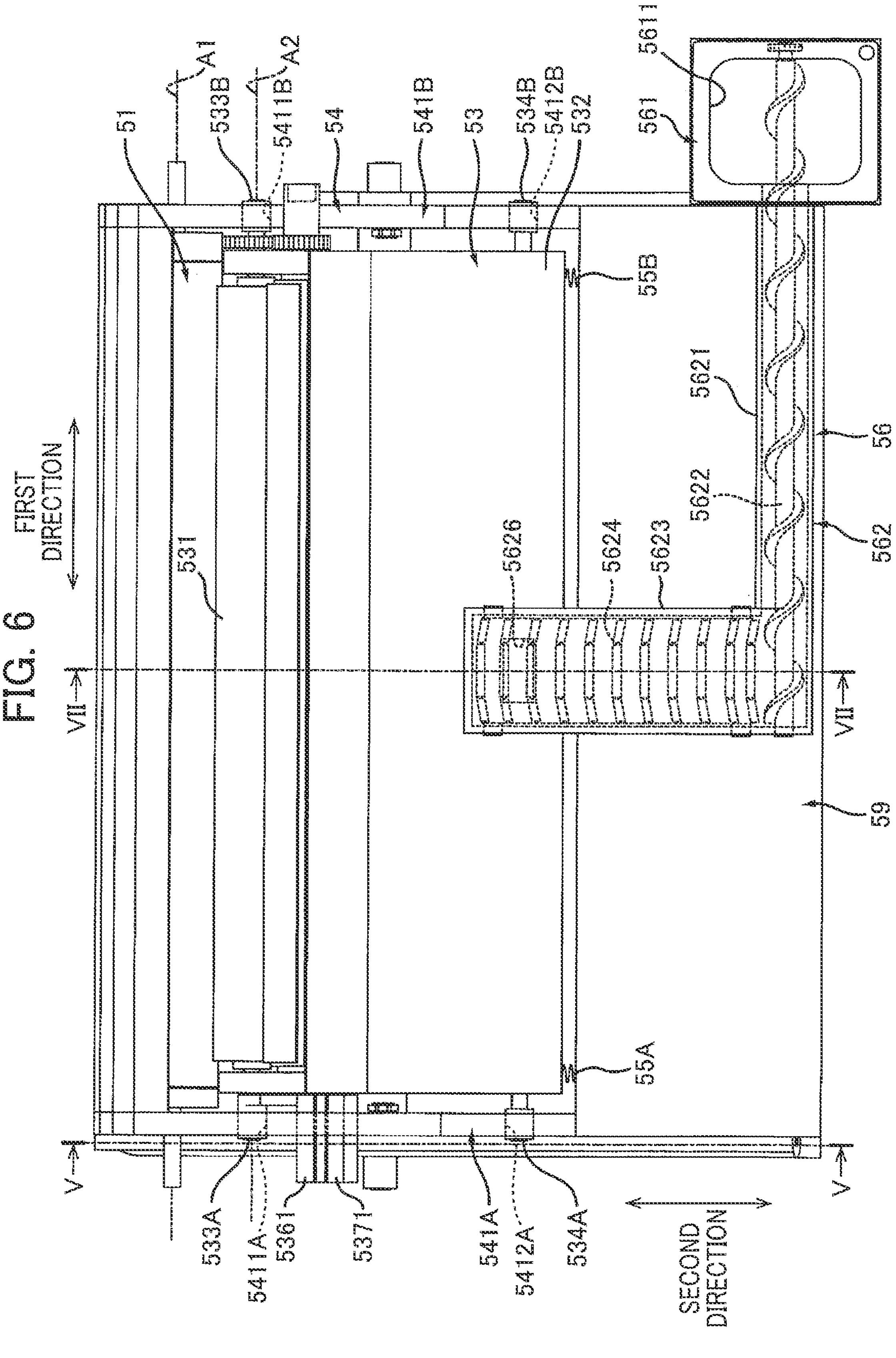
FIG. 6 is a plan view of the process cartridge of FIG. 4.

As illustrated in FIGS. 4 and 6, the developing device 53 is positioned between the first side plate 541A and the second side plate 541B in the first direction. Specifically, the developer casing 532 is positioned between the first side plate 541A and the second side plate 541B in the first direction. The developing device 53 is movable relative to the photosensitive drum 51 in the fourth direction (see FIG. 5).

Figure 7:
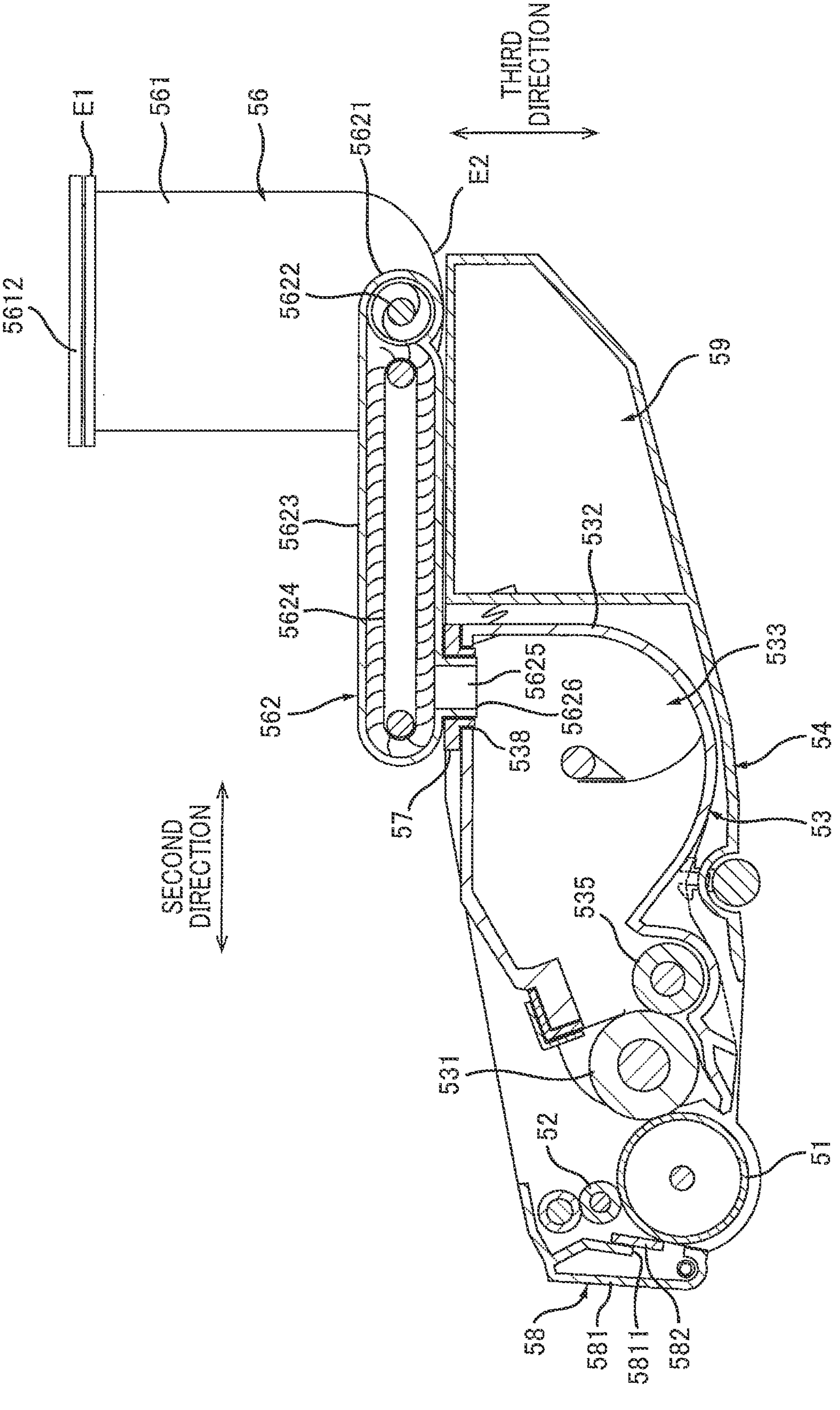
FIG. 7 is a cross-sectional view of the process cartridge of FIG. 4 taken along line VII-VII of FIG. 6.
Figure 8:
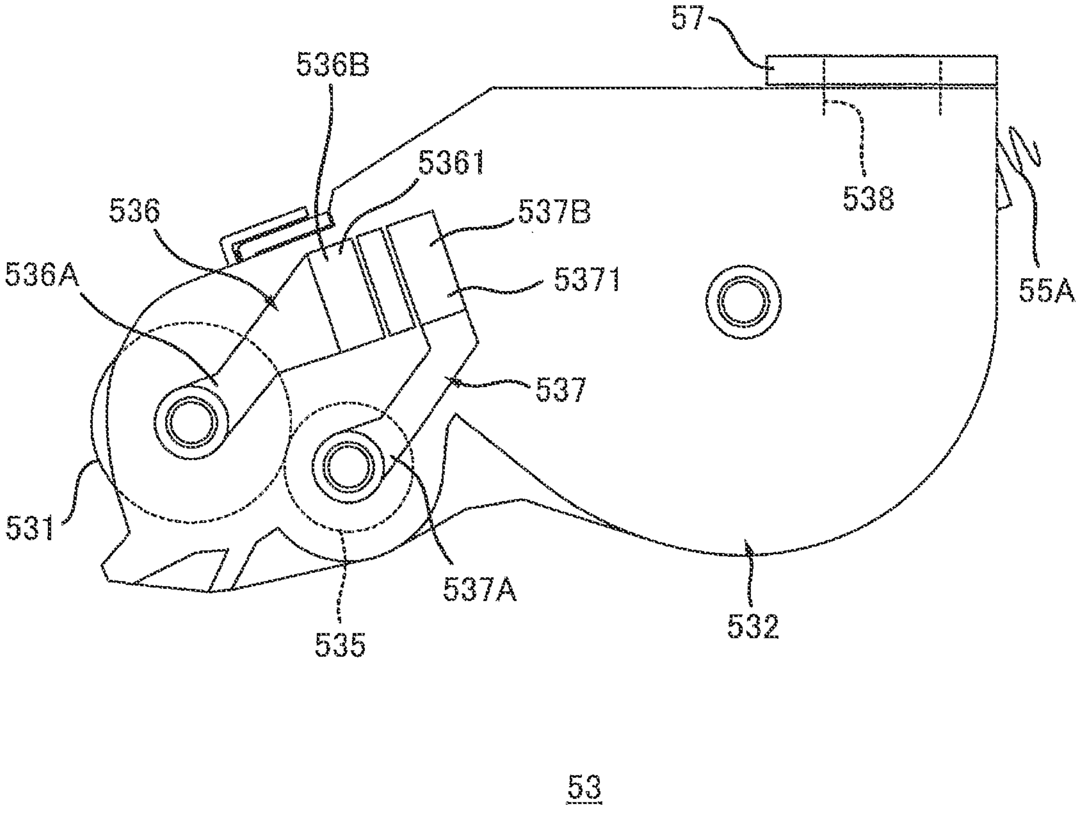
FIG. 8 is a side view of a developing device of FIG. 6.

In addition to the above-described developing roller 531 and developer casing 532, the developing device 53 includes two projections 533A and 533B, two projections 534A and 534B, a supply roller 535 (see FIG. 7), the developing electrode 536 (see FIG. 8), and the supply electrode 537 (see FIG. 8). The developing device 53 further has a receiving opening 538 (see FIG. 7).

<2.2.1 Projections 533A and 533B>

As illustrated in FIGS. 4 and 7, the projection 533A is positioned at the one end portion of the developing device 53 in the first direction. The projection 533A is positioned between the projection 534A and the photosensitive drum 51 in the fourth direction (see FIG. 5). The projection 533A extends in the first direction. The projection 533A extends along the developing axis A2. In the present embodiment, the projection 533A extends from one outer surface of the developer casing 532 in the first direction. The projection 533A has a cylindrical shape. The projection 533A receives one end portion of the shaft of the developing roller 531. The projection 533A is fitted in the through hole 5411A (see FIG. 5) of the first side plate 541A. The projection 533A may be mounted to one outer surface of the developer casing 532 in the first direction. The projection 533A may be one end portion of the shaft of the developing roller 531.

The projection 533B is positioned at the other end portion of the developing device 53 in the first direction. The projection 533B is positioned between the projection 534B and the photosensitive drum 51 in the fourth direction (see FIG. 5). The projection 533B extends in the first direction. The projection 533B extends along the developing axis A2. In the present embodiment, the projection 533B is the other end portion of the shaft of the developing roller 531. The projection 533B has a columnar shape. The projection 533B is fitted in the through hole 5411B of the second side plate 541B. The projection 533B may extend from the other outer surface of the developer casing 532 in the first direction. The projection 533B may be mounted to the other outer surface of the developer casing 532 in the first direction. The projection 533B may receive the other end portion of the shaft of the developing roller 531.

<2.2.2 Projections 534A and 534B>

As illustrated in FIGS. 4 and 6, the projection 534A is positioned at the one end portion of the developing device 53 in the first direction. The projection 534A is positioned away from the projection 533A in the fourth direction (see FIG. 5). The projection 534A extends in the first direction. In the present embodiment, the projection 534A extends from one outer surface of the developer casing 532 in the first direction. The projection 534A has a columnar shape. The projection 534A is fitted in the through hole 5412A of the first side plate 541A. The projection 534A may be mounted to one outer surface of the developer casing 532 in the first direction.

As illustrated in FIG. 6, the projection 534B is positioned at the other end portion of the developing device 53 in the first direction. The projection 534B is positioned away from the projection 533B in the fourth direction (see FIG. 5). The projection 534B extends in the first direction. In the present embodiment, the projection 534B extends from the other outer surface of the developer casing 532 in the first direction. The projection 534B has a columnar shape. The projection 534B is fitted in the through hole 5412B of the second side plate 541B. The projection 534B may be mounted to the other outer surface of the developer casing 532 in the first direction.

<2.2.3 Supply Roller 535>

As illustrated in FIG. 7, the supply roller 535 is configured to supply toner in the developer casing 532 to the developing roller 531. The supply roller 535 is in contact with the developing roller 531. The supply roller 535 is supported by the developer casing 532.

<2.2.4 Developing Electrode 536>

As illustrated in FIG. 8, the developing electrode 536 is electrically connected to the developing roller 531. In a state where the process cartridge 5 is attached to the main body casing 2, the developing electrode 536 is in contact with a first main body electrode (not illustrated) in the main body casing 2. The developing electrode 536 is configured to conduct bias voltage received from the first main body electrode to the developing roller 531 to apply the bias voltage to the developing roller 531.

Specifically, the developing electrode 536 is positioned at the one end portion of the developing device 53 in the first direction. The developing electrode 536 is mounted to one outer surface of the developer casing 532 in the first direction. The developing electrode 536 has one end portion 536A and the other end portion 536B. The one end portion 536A is electrically connected to the shaft of the developing roller 531. The other end 536B is positioned away from the one end portion 536A of the developing electrode 536. The other end portion 536B has the projection 5361.

As illustrated in FIG. 6, the projection 5361 extends in the first direction. The projection 5361 penetrates the opening 5413 of the first side plate 541A. In other words, a part of the developing electrode 536 penetrates the opening 5413. The leading end of the projection 5361 is positioned on the opposite side of the first side plate 541A from the second side plate 541B. In other words, the other end portion 536B of the developing electrode 536 is positioned on the opposite side of the first side plate 541A from the second side plate 541B in the first direction. In a state where the process cartridge 5 is attached to the main body casing 2, the projection 5361 is in contact with the first main body electrode in the main body casing 2.

<2.2.5 Supply Electrode 537>

The supply electrode 537 is electrically connected to the supply roller 535. The supply electrode 537 is positioned away from the developing electrode 536. The supply electrode 537 is insulated from the developing electrode 536. An insulating member may be interposed between the supply electrode 537 and the developing electrode 536. In a state where the process cartridge 5 is attached to the main body casing 2, the supply electrode 537 is in contact with a second main body electrode (not illustrated) in the main body casing 2. The second main body electrode is positioned away from the first main body electrode. The second main body electrode is insulated from the first main body electrode. The supply electrode 537 conducts bias voltage received from the second main body electrode to the supply roller 535 to apply the bias voltage to the supply roller 535.

Specifically, the supply electrode 537 is positioned at the one end portion of the developing device 53 in the first direction. The supply electrode 537 is mounted to one outer surface of the developer casing 532 in the first direction. The supply electrode 537 has one end portion 537A and the other end portion 537B. The one end portion 537A is electrically connected to the shaft of the supply roller 535. The other end portion 537B is positioned away from the one end portion 537A of the supply electrode 537. The other end 537B has the projection 5371.

As illustrated in FIG. 4, the projection 5371 extends in the first direction. The projection 5371 penetrates the opening 5413 of the first side plate 541A. Specifically, a part of the supply electrode 537 penetrates the opening 5413. The leading end of the projection 5371 is positioned on the opposite side of the first side plate 541A from the second side plate 541B in the first direction. In other words, the other end portion 537B of the supply electrode 537 is positioned on the opposite side of the first side plate 541A from the second side plate 541B in the first direction. In a state where the process cartridge 5 is attached to the main body casing 2, the projection 5371 is in contact with the second main body electrode in the main body casing 2.

<2.2.6 Receiving Port 538>

As illustrated in FIG. 7, the developer casing 532 has the receiving opening 538. The receiving opening 538 is in communication with the toner storage part 533. The receiving opening 538 is fitted with a toner discharge part 5625 of the replenishing device 56. The toner discharge part 5625 will be described later.

<2.3 Pressing Members 55A and 55B>

As illustrated in FIGS. 4 and 6, the pressing members 55A and 55B are configured to press the developing device 53 toward the photosensitive drum 51. The pressing member 55A presses the one end portion of the developing device 53 in the first direction. The pressing member 55B presses the other end portion of the developing device 53 in the first direction. The pressing member 55B is positioned away from the pressing member 55A in the first direction.

<2.4 Replenishing Device 56>

As illustrated in FIG. 4, the replenishing device 56 includes the toner receiving part 561 and the toner conveying part 562. In other words, the process cartridge 5 includes the toner receiving part 561 and toner conveying part 562.

<2.4.1 Toner Receiving Part 561>

The toner receiving part 561 is a container for receiving toner from the tonner bottle B (see FIG. 2). The toner receiving part 561 is positioned away from the photosensitive drum 51 and developing device 53 in the first direction. The toner receiving part 561 is positioned on the opposite side of the second side plate 541B from the first side plate 541A.

The toner receiving part 561 is positioned away from the photosensitive drum 51 in the second direction. The toner receiving part 561 is positioned away from the developing device 53 in the second direction. The toner receiving part 561 is positioned at one end portion of the process cartridge 5 in the second direction (see FIG. 7). In a state where the process cartridge 5 is attached to the main body casing 2, the toner receiving part 561 is positioned away from the reading device 10 in the second direction (see FIG. 1).

As illustrated in FIG. 4, the toner receiving part 561 extends in the third direction. The toner receiving part 561 has a tubular shape. The toner receiving part 561 has a first end portion E1 and a second end portion E2 in the third direction. In a state where the process cartridge 5 is attached to the main body casing 2 and the cover 3 is at the closing position, the first end portion E1 is positioned outside the main body casing 2 (see FIG. 1). In a state where the process cartridge 5 is attached to the main body casing 2, the first end portion E1 is positioned between the reading device 10 and the discharge tray 9 in the third direction (see FIG. 2). In other words, in a state where the process cartridge 5 is attached to the main body casing 2, the first end portion E1 is positioned above the discharge tray 9 (see FIG. 2). The first end portion E1 has a receiving opening 5611 and a lid 5612.

The receiving opening 5611 can receive toner from the toner bottle B (see FIG. 2). That is, the receiving opening 5611 is an opening for receiving toner from the toner bottle B. In a state where the process cartridge 5 is attached to the main body casing 2, the receiving opening 5611 is positioned away from the reading device 10 in the second direction (see FIG. 1). In a state where the process cartridge 5 is attached to the main body casing 2, the receiving opening 5611 is positioned away from the operation panel 11 in the first direction (see FIG. 1). This suppresses the operation panel 11 from getting dirty with toner. In a state where the process cartridge 5 is attached to the main body casing 2, the receiving opening 5611 is positioned at the other end portion of the main body casing 2 in the first direction. In a state where the process cartridge 5 is attached to the main body casing 2, the receiving opening 5611 is positioned between the reading device 10 and the discharge tray 9 in the third direction (see FIG. 1). In other words, in a state where the process cartridge 5 is attached to the main body casing 2, the receiving opening 5611 is positioned above the discharge tray 9 (see FIG. 1). Thus, the receiving opening 5611 can be suppressed from being covered with the sheet S placed on the discharge tray 9. Accordingly, the toner bottle B (see FIG. 2) can be easily connected to the toner receiving part 561 even in a state where the sheet S is placed on the discharge tray 9.

As illustrated in FIG. 4, the lid 5612 is pivotally movable about an axis A11 between a closed position and an open position. The axis A11 extends in the third direction. As indicated by the solid line in FIG. 4, in a state where the lid 5612 is at the closed position, the lid 5612 closes the receiving opening 5611. On the other hand, as indicated by the imaginary line (two-dot chain line) in FIG. 4, in a state where the lid 5612 is at the open position, the lid 5612 opens the receiving opening 5611.

As illustrated in FIG. 2, in a state where the process cartridge 5 is attached to the main body casing 2 and the cover 3 is at the closing position, the second end portion E2 is positioned inside the main body casing 2. The second end portion E2 is positioned between the first end portion E1 of the toner receiving part 561 and the waste toner storage part 59. The second end portion E2 has a bottom wall having a circular arc shape.

<2.4.2 Toner Conveying Part 562>

As illustrated in FIGS. 4 and 6, the toner conveying part 562 is configured to convey toner in the toner receiving part 561 to the developing device 53. The toner conveying part 562 has a first toner pipe 5621, an auger screw 5622, a second toner pipe 5623, a belt conveyer 5624, and the toner discharge part 5625 (see FIG. 7).

The first toner pipe 5621 allows passage of toner from the toner receiving part 561 to the second toner pipe 5623. The first toner pipe 5621 extends in the first direction. The first toner pipe 5621 is connected to the second toner pipe 5623. The first toner pipe 5621 is in communication with the toner receiving part 561. The first toner pipe 5621 is fixed to the process frame 54. Specifically, the first toner pipe 5621 is fixed to the waste toner storage part 59.

The auger screw 5622 is configured to convey toner contained in the toner receiving part 561 toward the second toner pipe 5623 in the first direction. The auger screw 5622 is positioned inside the first toner pipe 5621. The auger screw 5622 extends in the first direction.

As illustrated in FIGS. 6 and 7, the second toner pipe 5623 allows passage of toner from the first toner pipe 5621 to the toner discharge part 5625 (see FIG. 7). The second toner pipe 5623 extends in the second direction. The second toner pipe 5623 is connected to the first toner pipe 5621. Specifically, as illustrated in FIG. 4, one end portion of the second toner pipe 5623 in the second direction is connected to the first toner pipe 5621. The second toner pipe 5623 is in communication with the first toner pipe 5621. The second toner pipe 5623 is fixed to the process frame 54. Specifically, the second toner pipe 5623 is fixed to the waste toner storage part 59. The first and second toner pipes 5621 and 5623 are fixed to the process frame 54, so that the toner receiving part 561 and toner conveying part 562 cannot move relative to the photosensitive drum 51.

The belt conveyer 5624 is configured to convey toner from the first toner pipe 5621 toward the toner discharge part 5625 in the second direction. The belt conveyer 5624 is positioned inside the second toner pipe 5623.

The toner discharge part 5625 can discharge toner from the second toner pipe 5623. The toner discharge part 5625 is positioned away from the first toner pipe 5621 in the second direction. The toner discharge part 5625 is positioned at the other end portion of the second toner pipe 5623 in the second direction. The toner discharge part 5625 extends from the second toner pipe 5623 toward the developing device 53. The toner discharge part 5625 extends in the third direction. The toner discharge part 5625 has a tubular shape. The toner discharge part 5625 is in communication with the second toner pipe 5623. The toner discharge part 5625 is fitted in the receiving opening 538 of the developing device 53. The toner discharge part 5625 has a discharge opening 5626.

The discharge opening 5626 allows toner to be discharged therethrough. The discharge opening 5626 is in communication with the toner storage part 533 of the developing device 53. The toner storage part 533 can store therein toner discharged from the discharge opening 5626.

<2.5 Sealing Member 57>

As illustrated in FIGS. 4 and 7, the sealing member 57 is disposed around the toner discharge part 5625. The sealing member 57 seals a gap between the toner discharge part 5625 and the toner storage part 533. The sealing member 57 is elastically deformable. The sealing member 57 is elastically deformed between the toner discharge part 5625 and the toner storage part 533 in accordance with movement of the developing device 53 relative to the photosensitive drum 51. Thus, even when the developing device 53 moves relative to the photosensitive drum 51, the gap between the toner discharge part 5625 and the toner storage part 533 can be sealed with the sealing member 57. As a result, even when the developing device 53 moves relative to the photosensitive drum 51, toner can be suppressed from leaking from the gap between the toner discharge part 5625 and the toner storage part 533.

<2.6 Drum Cleaner 58>

As illustrated in FIG. 4, the drum cleaner 58 is positioned at the other end portion of the process cartridge 5 in the second direction. The drum cleaner 58 is configured to clean the surface of the photosensitive drum 51. The drum cleaner 58 is positioned between the first side plate 541A and the second side plate 541B in the first direction. The drum cleaner 58 includes a cleaner casing 581 and a cleaning member 582 (see FIG. 7).

The cleaner casing 581 is positioned between the first side plate 541A and the second side plate 541B in the first direction. The cleaner casing 581 extends in the first direction. One end portion of the cleaner casing 581 in the first direction is connected to the first side plate 541A, and the other end portion of the cleaner casing 581 in the first direction is connected to the second side plate 541B.

As illustrated in FIG. 7, the cleaner casing 581 has an opening 5811. The cleaner casing 581 stores therein waste toner.

The cleaning member 582 is mounted to the cleaner casing 581. The cleaning member 582 extends in the first direction. The cleaning member 582 has a plate-like shape. The cleaning member 582 cleans the peripheral surface of the photosensitive drum 51. Specifically, the edge of the cleaning member 582 contacts the surface of the photosensitive drum 51. When the photosensitive drum 51 rotates, the edge of the cleaning member 582 contacts waste toner on the surface of the photosensitive drum 51 to remove the waste toner from the surface of the photosensitive drum 51. The removed waste toner passes through the opening 5811 and then is stored in the cleaner casing 581.

<2.7 Waste Toner Storage part 59>

As illustrated in FIGS. 4 and 7, the waste toner storage part 59 is positioned at the one end portion of the process cartridge 5 in the second direction. The waste toner storage part 59 stores therein the waste toner that has been removed from the surface of the photosensitive drum 51 by the drum cleaner 58. The waste toner storage part 59 is positioned between the first side plate 541A and the second side plate 541B in the first direction.

As illustrated in FIG. 2, in a state where the process cartridge 5 is attached to the main body casing 2 and the cover 3 is at the closing position, the waste toner storage part 59 is positioned between the developing device 53 and the cover 3.

<2.8 Waste Toner Pipe 60>

As illustrated in FIGS. 4 and 5, the waste toner pipe 60 is mounted to the first side plate 541A. The waste toner pipe 60 is positioned on the opposite side of the first side plate 541A from the second side plate 541B in the first direction. The waste toner pipe 60 overlaps a part of the photosensitive drum 51 as viewed in the first direction. The waste toner pipe 60 extends in the second direction. One end portion of the waste toner pipe 60 in the second direction is connected to the waste toner storage part 59, and the other end portion of the waste toner pipe 60 in the second direction is connected to the drum cleaner 58. The waste toner passes through the waste toner pipe 60 to be conveyed from the drum cleaner 58 toward the waste toner storage part 59. In other words, the waste toner is conveyed from the drum cleaner 58 toward the waste toner storage part 59 through the waste toner pipe 60.

<2.9 Screw 61>

As illustrated in FIG. 5, the screw 61 is positioned inside the waste toner pipe 60. The screw 61 conveys waste toner in the drum cleaner 58 to the waste toner storage part 59. The screw 61 is not particularly limited in type as long as it can convey toner. Examples of the screw 61 include an auger screw and a shaftless screw.

3. FUNCTIONS AND EFFECTS (1) According to the image forming apparatus 1, as illustrated in FIG. 2, when the amount of toner remaining in the developing device 53 becomes small, the toner receiving part 561 can be replenished with toner (i.e., toner can be supplied to the toner receiving part 561) from the outside of the image forming apparatus 1 in a state where the process cartridge 5 is attached to the image forming apparatus 1.

The toner supplied to the toner receiving part 561 is conveyed by the toner conveying part 562 to the developing device 53 in the image forming apparatus 1.

Thus, when the remaining amount of toner in the developing device 53 becomes small, the developing device 53 can be replenished with toner without replacement of the process cartridge 5.

As a result, replacement frequency of the process cartridge 5 can be reduced.

(2) According to the image forming apparatus 1, as illustrated in FIG. 1, the receiving opening 5611 of the toner receiving part 561 is positioned away from the reading device 10 in the second direction.

Thus, even when the image forming apparatus 1 is provided with the reading device 10, an operation for replenishing the toner receiving part 561 with toner is not hindered by the reading device 10.

As a result, even when the image forming apparatus 1 is provided with the reading device 10, an operation for replenishment of toner can be smoothly performed.

(3) According to the image forming apparatus 1, as illustrated in FIG. 1, the receiving opening 5611 of the toner receiving part 561 is positioned away from the operation panel 11 in the first direction.

Thus, the operation panel 11 can be suppressed from getting dirty with toner.

(4) According to the image forming apparatus 1, as illustrated in FIGS. 1 and 2, the receiving opening 5611 of the toner receiving part 561 is positioned between the reading device 10 and the discharge tray 9 in the third direction.

Thus, the receiving opening 5611 can be suppressed from being covered with the sheet S placed on the discharge tray 9.

As a result, the toner receiving part 561 can be smoothly replenished with toner even in a state where the sheet S is placed on the discharge tray 9.

(5) According to the image forming apparatus 1, as illustrated in FIG. 7, the sealing member 57 seals a gap between the toner discharge part 5625 and the toner storage part 533. The sealing member 57 is elastically deformable.

The sealing member 57 is elastically deformed between the toner discharge part 5625 and the toner storage part 533 in accordance with movement of the developing device 53 relative to the photosensitive drum 51.

Thus, even when the developing device 53 moves relative to the photosensitive drum 51, the gap between the toner discharge part 5625 and the toner storage part 533 can be sealed with the sealing member 57.

As a result, even when the developing device 53 moves relative to the photosensitive drum 51, toner can be suppressed from leaking from the gap between the toner discharge part 5625 and the toner storage part 533.

(6) According to the image forming apparatus 1, as illustrated in FIG. 2, in a state where the process cartridge 5 is attached to the main body casing 2 and the cover 3 is at the closing position, the waste toner storage part 59 is positioned between the developing device 53 and the cover 3.

The amount of waste toner to be stored in the waste toner storage part 59 in a time span from a time when a new process cartridge 5 is attached to a time when the new process cartridge 5 is detached for replacement may increase due to a reduction in the replacement frequency of the process cartridge 5.

In view of this, the waste toner storage part 59 is positioned between the developing device 53 and the cover 3 in the image forming apparatus 1, as described above. This structure enables to utilize a space between the developing device 53 and the cover 3, so that a sufficient capacity can be ensured for the waste toner storage part 59.

Thus, even when the replacement frequency of the process cartridge 5 is reduced, the waste toner can be stored in the waste toner storage part 59.

4. MODIFICATIONS (1) The image forming apparatus 1 need not necessarily be provided with the reading device 10.

(2) The receiving opening 5611 may be positioned below the discharge tray 9.

What is claimed is:

1. A process cartridge attachable to an image forming apparatus, the process cartridge comprising:
- a photosensitive drum;
- a developing device configured to supply toner to the photosensitive drum, the developing device being movable relative to the photosensitive drum, the developing device comprising a developing roller and a toner storage part for storing toner therein;
- a toner receiving part having a receiving opening for receiving toner from outside the process cartridge;
- a toner conveying part configured to convey toner in the toner receiving part to the developing device, the toner conveying part comprising a toner discharge part having a discharge opening for discharging toner into the toner storage part of the developing device; and
- a sealing member for sealing a gap between the toner discharge part and the toner storage part, the sealing member being elastically deformable.

2. The process cartridge according to claim 1,
- wherein the toner receiving part and the toner conveying part are immovable relative to the photosensitive drum.

3. The process cartridge according to claim 1, further comprising:
- a first side plate supporting one end portion of the photosensitive drum; and
- a second side plate supporting another end portion of the photosensitive drum,
- wherein the developing device is positioned between the first side plate and the second side plate.

4. The process cartridge according to claim 3,
- wherein the photosensitive drum is rotatable about an axis extending in a first direction, and
- wherein the discharge opening is positioned between the first side plate and the second side plate in the first direction.

5. The process cartridge according to claim 4,
- wherein the toner receiving part is farther from the photosensitive drum than the developing device is from the photosensitive drum in a second direction orthogonal to the first direction,
- wherein the toner receiving part has one end portion and another end portion in a third direction orthogonal to both the first direction and the second direction, and
- wherein the one end portion of the toner receiving part in the third direction is connected to the toner conveying part.

6. The process cartridge according to claim 5, further comprising:
- a drum cleaner for cleaning a surface of the photosensitive drum;

a waste toner storage part for storing therein waste toner removed from the surface of the photosensitive drum by the drum cleaner; and a waste toner pipe through which the waste toner is conveyed from the drum cleaner toward the waste toner storage part.

7. The process cartridge according to claim 6, wherein the waste toner pipe overlaps a part of the photosensitive drum as viewed in the first direction.

8. The process cartridge according to claim 6, wherein the receiving opening is formed at the another end portion of the toner receiving part in the third direction.

9. The process cartridge according to claim 8, wherein the waste toner storage part is positioned on an opposite side of the toner conveying part from the receiving opening in the third direction.

10. The process cartridge according to claim 3, wherein the photosensitive drum is rotatable about an axis extending in a first direction, and wherein the receiving opening is positioned on an opposite side of the second side plate from the first side plate in the first direction.

* * * * *